United States Patent [19]

MacDonald et al.

[11] Patent Number: 5,630,099
[45] Date of Patent: May 13, 1997

[54] NON-VOLATILE MEMORY ARRAY CONTROLLER CAPABLE OF CONTROLLING MEMORY BANKS HAVING VARIABLE BIT WIDTHS

[75] Inventors: James R. MacDonald, Buda; Douglas D. Gephardt, Austin, both of Tex.

[73] Assignee: Advanced Micro Devices, Sunnyvale, Calif.

[21] Appl. No.: 166,124

[22] Filed: Dec. 10, 1993

[51] Int. Cl.$^6$ .................................................. G06F 12/04
[52] U.S. Cl. ..................................... 395/497.03; 395/307
[58] Field of Search ..................................... 395/425, 400, 395/325, 500, 700, 497.01, 497.03, 307, 497.02; 364/239.3, 240.3, 254.9

[56] References Cited

U.S. PATENT DOCUMENTS

| | | | |
|---|---|---|---|
| 4,361,869 | 11/1982 | Johnson et al. | 364/200 |
| 4,494,013 | 1/1985 | Ludowyk | 307/241 |
| 4,716,527 | 12/1987 | Graciotti | 395/500 |
| 4,831,514 | 5/1989 | Turlakov et al. | 395/500 |
| 5,109,494 | 4/1992 | Ehlig et al. | 395/325 |
| 5,119,498 | 6/1992 | McNeill et al. | 395/800 |
| 5,280,598 | 1/1994 | Osaki et al. | 395/307 |
| 5,448,521 | 9/1995 | Curry et al. | 395/189.02 |
| 5,471,632 | 11/1995 | Gavin et al. | 395/284 |

FOREIGN PATENT DOCUMENTS 2171230A  8/1986  European Pat. Off. .

OTHER PUBLICATIONS

Hennessy et al., "Computer Architecture A Quantitative Approach", 1990, pp. 432–438.
IBM Technical Disclosure Bulletin, "Bus Size Independent Architecture", vol. 28 No. 8 Jan. 1986, pp. 3579–3581.

*Primary Examiner*—Eddie P. Chan
*Assistant Examiner*—Kevin L. Ellis
*Attorney, Agent, or Firm*—Conley, Rose & Tayon, P.C.; B. Noel Kivlin

[57] ABSTRACT

A non-volatile memory controller is provided which is connectable directly to the local bus of a computer system and which allows access to one or more 32-bit banks of ROM and to an 8-bit bank of non-volatile memory. The 8-bit bank of non-volatile memory may be used, for example, to store BIOS code, and may be implemented using a ROM or flash memory device. The non-volatile memory controller includes a data router, a sequencer, and a set of output latches for routing the 8-bit BIOS code (stored within the 8-bit bank) to selected byte lanes of the local bus and for converting the 8-bit data to 32-bit local bus data. The non-volatile memory controller further supports high performance, 32-bit accesses to the user software stored within the 32-bit banks. If the system designer or user instead must maximize the memory capacity of the computer system, the 8-bit bank of memory may be replaced with a larger 32-bit bank of memory. In this configuration, a control signal is provided to the non-volatile memory controller to indicate that a 32-bit bank is connected rather than an 8-bit bank. The control signal causes the sequencer and the data router to be disabled. When a memory access to the 32-bit bank is executed, the non-volatile memory controller accesses the data within the 32-bit bank and drives the data directly on the CPU local bus.

20 Claims, 8 Drawing Sheets

NON-VOLATILE MEMORY ARRAY CONTROLLER CAPABLE OF CONTROLLING MEMORY BANKS HAVING VARIABLE BIT WIDTHS

BACKGROUND OF THE INVENTION

1. Field of the Invention

This invention relates to computer systems and more particularly to non-volatile memory array controllers employed within computer systems.

2. Description of the Relevant Art

Most computer systems include software code in ROM or flash memory that allows the system to read the operating system software from a disk at power-up. This software code is often referred to as the boot-strap code or boot code, and the process of loading the operating system from the disk is called "booting the system". The boot code typically contains only enough software to read the operating system, which is generally stored on a specific track of the disk. The operating system software itself provides the capability of performing more general read and write accesses. A typical computer system includes a dedicated ROM (read only memory) integrated circuit memory chip referred to as the BIOS (basic input/output system) ROM which contains the boot code and a collection of additional subroutines (referred to as BIOS code) to provide a standard software interface for the system.

Due to the low cost and low power consumption of read only memory, ROM integrated circuits are also becoming a popular storage medium for user software such as word processing programs as well as for the operating system software. This is particularly true for applications within portable computer systems. The read only memory used to store such user software is typically quite large in capacity (compared to that of the BIOS ROM) and is often arranged as one or more ROM banks that may be selectively accessed through a memory controller. The memory capacity or the number of banks comprising this user ROM may typically be varied to suit the needs of a particular user.

FIG. 1 is a block diagram that illustrates the memory organization of a typical computer system 10. The computer system 10 includes a microprocessor central processing unit (CPU) 12 coupled to a RAM controller 14 and a bus bridge 16 through a CPU local bus 18. A random access memory (RAM) unit 20 is coupled to RAM controller 14. Bus bridge 16 provides an interface between CPU local bus 18 and an X-bus 22 and an ISA (Industry Standard Architecture) peripheral bus 24. An 8-bit BIOS ROM unit 26 is coupled to X-bus 22 through a BIOS ROM controller 28, and a 16-bit ROM bulk storage unit 30 is coupled to ISA peripheral bus 24 through a ROM controller 32.

Microprocessor 12 is illustrative of, for example, a model 80486 microprocessor. CPU local bus 18 is a 32-bit bus that supports high speed data transfers between microprocessor 12, RAM controller 14, and bus bridge 16, among other things. The 32-bit RAM unit 20 serves as a primary high speed memory resource for computer system 10.

ROM bulk storage unit 30 is a relatively large storage unit having a capacity of, for example, two Mbytes. BIOS ROM unit 26, on the other hand, is a relatively small memory unit having a capacity of, for example, 128K bytes. Bus bridge 16 controls the transfer of data between CPU local bus 18 and ISA peripheral bus 24, and further controls the transfer of data between CPU local bus 18 and X-bus 22. Bus bridge 16 includes circuitry that converts 8-bit data on X-bus 22 to 32-bit data on CPU local bus 18, and includes similar circuitry that converts 16-bit data on ISA peripheral bus 24 to 32-bit data on CPU local bus 18.

Since the BIOS code is typically shadowed within RAM unit 20 upon system initialization (that is, since the BIOS ROM 26 is transferred into RAM unit 20 upon system initialization and is executed out of the RAM), the use of an 8-bit memory device (rather than a 32-bit or a 16-bit device) for BIOS ROM 26 does not significantly degrade the overall speed characteristics of the system. The use of the 8-bit dedicated memory device for BIOS ROM 26 instead allows for a reduction in the cost of the system when a flash memory device is required, which is relatively expensive in terms of cost-per-bit of storage (compared to standard ROM devices). The bit width of the ROM bulk storage unit 30, on the other hand, can strongly impact the overall performance of the system, and thus it is desirable to maximize the bit width of the ROM bulk storage unit.

Although the memory capacity or the number of banks comprising ROM bulk storage unit 30 can typically be varied according to the user requirements, the separate integrated circuit chip for BIOS ROM 26 is still provided and requires a separate BIOS ROM controller 28. This is true even if a flash memory device is not required to allow reprogramming of the BIOS code. Therefore, overall cost of the system may be relatively high due to the number of integrated circuits incorporated within the system.

SUMMARY OF THE INVENTION

The problems outlined above are in large part solved by a non-volatile memory controller for controlling memory banks having variable bit widths in accordance with the present invention. In one embodiment, a non-volatile memory controller is connected directly to the local bus of a computer system and allows access to one or more 32-bit banks of ROM and to an 8-bit bank of memory. The 8-bit bank may be used, for example, to store BIOS code, and may be implemented using, for example, ROM or flash memory. The memory controller includes a data router, a sequencer, and a set of output latches for routing the 8-bit BIOS code (stored within the 8-bit bank) to selected byte lanes of the local bus and for converting the 8-bit data to 32-bit local bus data. The controller further supports high performance, 32-bit accesses to the user software stored within the 32-bit banks. If the system designer or user instead must maximize the memory capacity of the computer system, the 8-bit bank of memory may be replaced with a larger 32-bit bank of memory. In this configuration, a control signal is provided to the memory controller to indicate that a 32-bit bank is connected rather than an 8-bit bank. The control signal causes the sequencer and the data router to be disabled. When a memory access to the 32-bit bank is executed, the memory controller accesses the data within the 32-bit bank and drives the data directly on the CPU local bus.

Broadly speaking, the present invention contemplates a computer system comprising a microprocessor, a local bus coupled to the microprocessor and including at least a first byte lane and a second byte lane, and a memory controller coupled to the local bus. The computer system further includes a memory data bus coupled to the memory controller and including at least a first byte lane and a second byte lane, and a first bank of non-volatile memory coupled to the memory data bus. The memory controller includes a first output buffer for driving data from the first bank of non-volatile memory on the first byte lane of the local bus and a second output buffer for driving data from the first bank of non-volatile memory on the second byte lane of the local bus. The memory controller further includes a data routing unit for selectively routing data from the first byte lane of the memory data bus to either the first output buffer or the second output buffer, and an interface control unit for receiving a local bus read signal and a local bus address signal. The interface control unit is capable of generating a memory read signal and a memory address signal in response to the local bus read signal and the local bus address signal such that data is provided from the first bank of non-volatile memory simultaneously to the first and the second byte lanes of the memory bus if a memory size input signal indicates that the first bank of non-volatile memory has a first predetermined bit width. The interface control unit is further capable of generating a first and a second memory read signal in response to the local bus read signal such that data is sequentially provided from the first bank of read only memory through the first byte lane of the memory bus to the data routing unit if the memory size input signal indicates that the first bank of non-volatile memory has a second predetermined bit width.

The present invention further contemplates a memory controller comprising a first output buffer for driving data from a first bank of non-volatile memory on a first byte lane of a local bus, a second output buffer for driving data from the first bank of non-volatile memory on a second byte lane of the local bus, a data routing unit for selectively routing data from a first byte lane of a memory data bus to either the first output buffer or to the second output buffer, and an interface control unit for receiving a local bus read signal and a local bus address signal. The interface control unit is capable of generating a memory read signal and a memory address signal in response to the local bus read signal and the local bus address signal such that data is provided from the first bank of non-volatile memory simultaneously to the first byte lane and to a second byte lane of the memory bus if a memory size input signal indicates that the first bank of non-volatile memory has a first predetermined bit width. The interface control unit is further capable of generating a first and a second memory read signal in response to the local bus read signal such that data is sequentially provided from the first bank of non-volatile memory through the first byte lane of the memory bus to the data routing unit if the memory size input signal indicates that the first bank of non-volatile memory has a second predetermined bit width.

The present invention finally contemplates a method for operating a memory controller connected to a first memory bank, a second memory bank, a first byte lane of a local bus, and a second byte lane of said local bus. The method comprises the steps of providing a signal to the memory controller indicative of the bit width of the second memory bank, executing a memory read cycle on the local bus, determining whether the read cycle corresponds to a memory location contained by the first memory bank or by the second memory bank, reading a first byte and a second byte of data from the first memory bank simultaneously and providing the first and second bytes of data to the first and second byte lanes of the local bus if the memory read cycle corresponds to a location within the first memory bank. If the memory read cycle corresponds to a memory location contained by the second memory bank, the method comprises the further steps of either reading a first and a second byte of data from the second memory bank simultaneously and providing the first and second bytes of data to the first and second byte lanes of the local bus if the control signal indicates that the second memory bank has a first predetermined bit width, or reading a first byte of data from the second memory bank and storing the first byte of data within a temporary storage location of the memory controller, reading a second byte of data from the second memory bank subsequent to the reading of the first byte of data, and providing the first and second bytes of data from the second memory bank to the local bus simultaneously.

BRIEF DESCRIPTION OF THE DRAWINGS

Other objects and advantages of the invention will become apparent upon reading the following detailed description and upon reference to the accompanying drawings in which.

Figure 1:
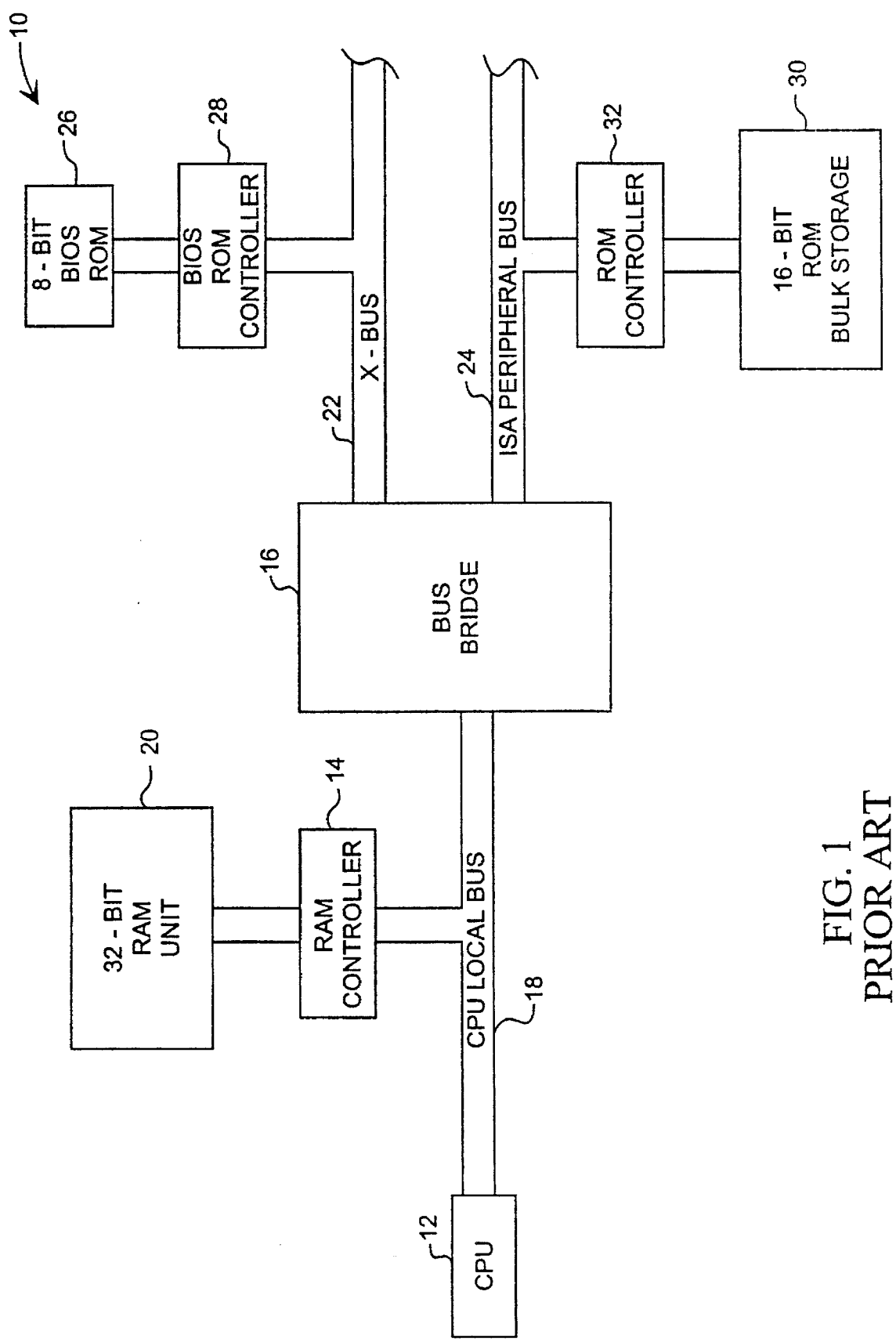
FIG. 1 is a block diagram that illustrates the memory organization of a typical computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
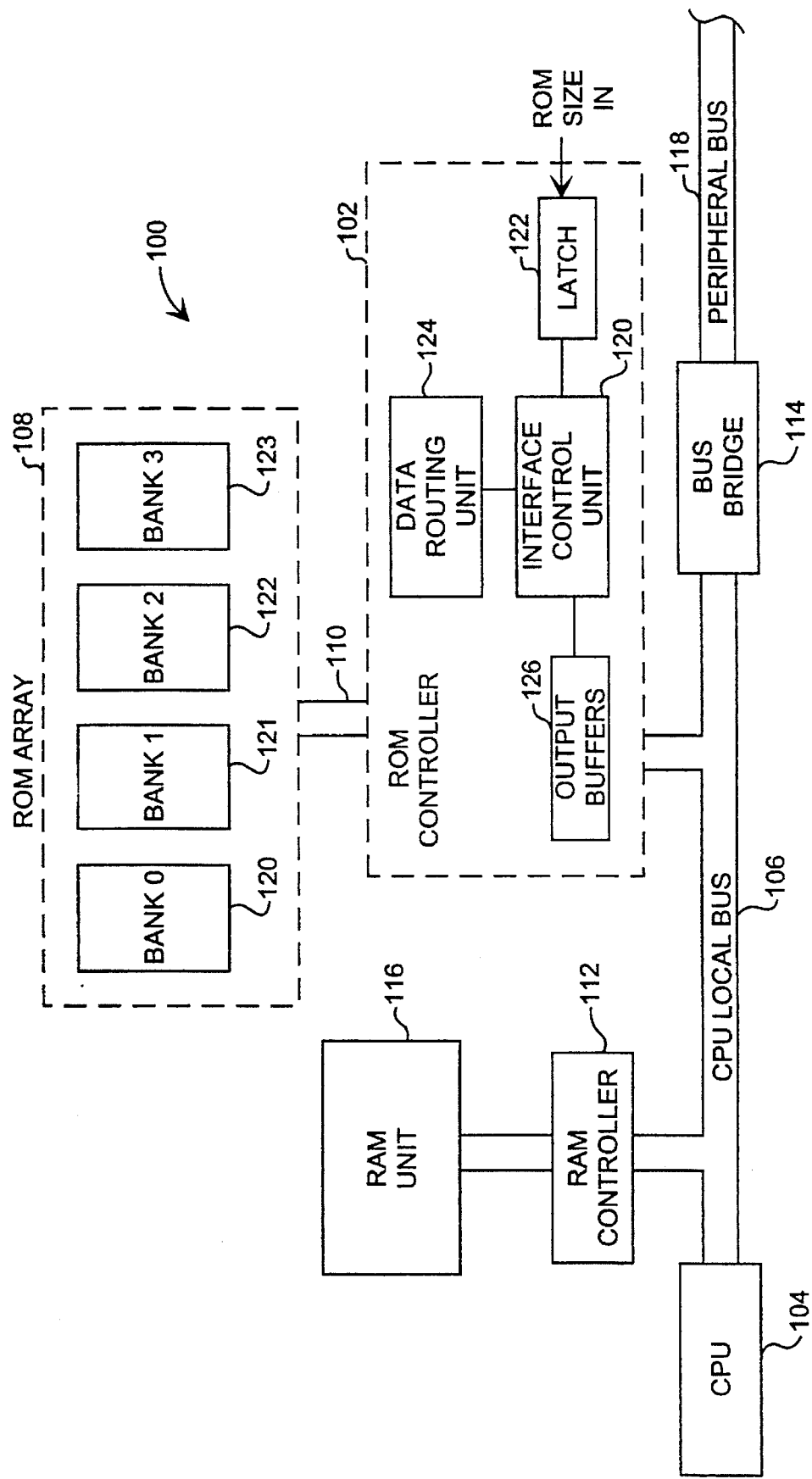
FIG. 2 is a block diagram of a computer system including a ROM array controller according to the present invention.

Referring next to FIG. 2, a block diagram of a computer system 100 including a non-volatile memory controller 102 according to the present invention is shown. The non-volatile memory controller 102 is coupled to a microprocessor 104 through a CPU local bus 106 and to a ROM array 108 through a memory bus 110. A RAM controller 112 and a bus bridge 114 are further shown coupled to the CPU local bus 106. RAM controller 112 controls memory accesses to a RAM unit 116, and bus bridge 114 supports transfer cycles to peripheral devices (not shown) coupled to a peripheral bus 118. Microprocessor 104 is illustrative, for example, a model 80486 microprocessor, and peripheral bus 118 is illustrative, for example, a PCI standard configuration bus.

ROM array 108 includes four banks 120–123 of read only memory. In the embodiment of FIG. 2, banks 120–122 are 32-bit banks of memory each having a capacity of, for example, 512K bytes. Depending upon the system configuration, bank 123 may be either an 8-bit bank of memory or a 32-bit bank of memory.

Non-volatile memory controller 102 includes an interface control unit 120 coupled to a latch 122, a data routing unit 124, and an output buffers unit 126. Non-volatile memory controller 102 controls the transfer of 32-bit data from ROM banks 120–122 to the CPU local bus 106. An input signal labeled the "ROM SIZE IN" signal is provided to non-volatile memory controller 102 and is indicative of the bit width of ROM bank 123. The operation of the non-volatile memory controller will be better understood from the following.

Figure 3:
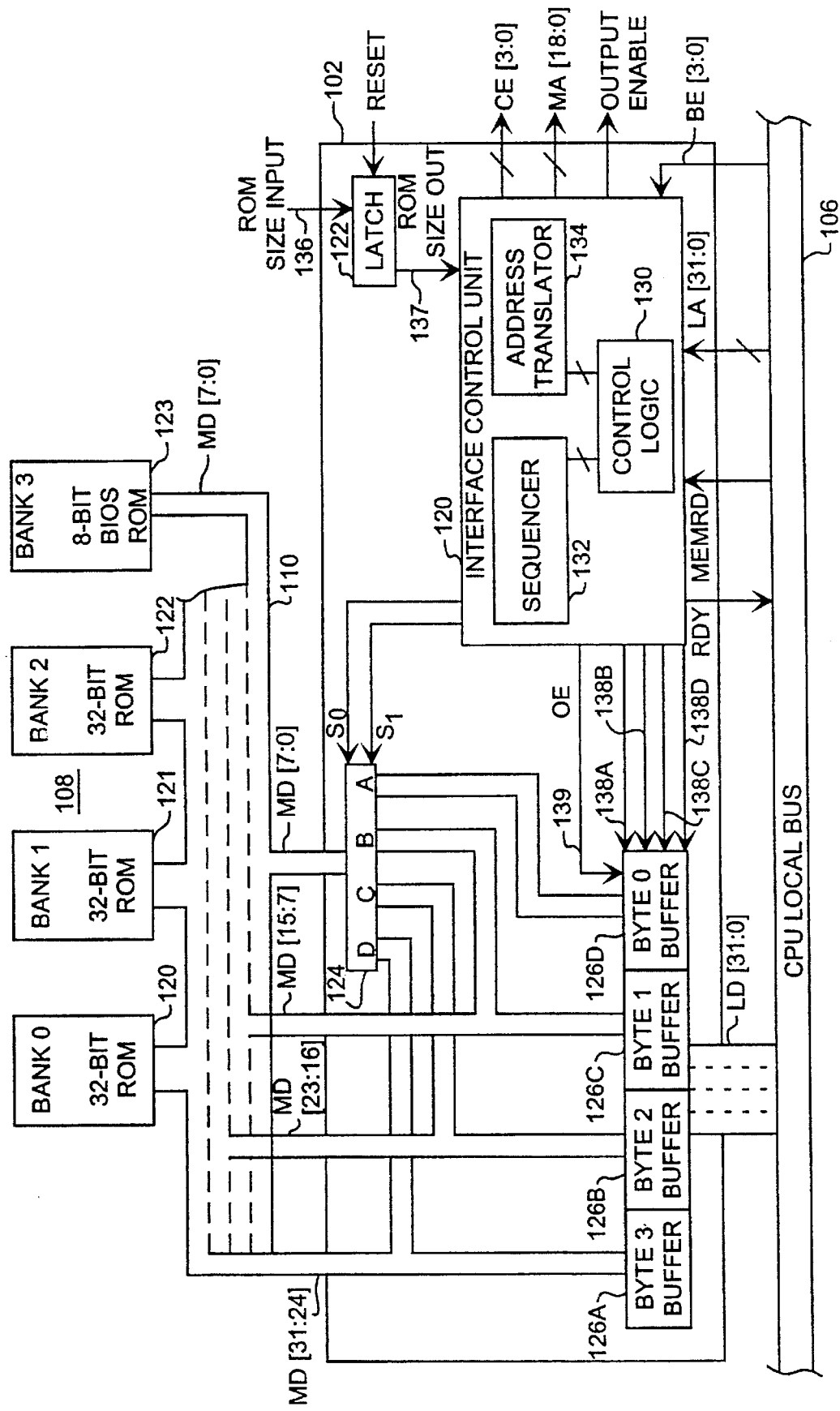
FIG. 3 is a block diagram of the non-volatile memory array controller connected to a ROM array including several 32-bit banks of ROM and an 8-bit bank of ROM.

Referring to FIG. 3, a block diagram is shown that illustrates ROM array 108 and non-volatile memory controller 102 in greater detail. Circuit portions that correspond to those of FIG. 2 are numbered identically. In the configuration of FIG. 3, banks 120–122 are 32-bit banks and ROM bank 123 is an 8-bit ROM bank. The memory bus 110 includes a 32-bit data bus MD[31:0] and is depicted with four byte lanes formed by data lines MD[7:0], MD[15:7], MD[23:16], and MD[31:24]. The data output port of ROM banks 120–122 are connected to data lines MD[31:0], while the data output port of ROM bank 123 is connected to only the lower byte lane formed by data lines MD[7:0].

Non-volatile memory controller 102 generates a set of chip enable output signals CE[3:0], an output enable signal, and memory address signal MA[18:0]. These signals are provided to ROM array 108 for controlling the reading of data from the ROM banks 120–123.

Interface control unit 120 includes a control logic block 130 coupled to a sequencer 132 and an address translator 134. Interface control unit 120 is connected by a first set of control lines ($S_0$ and $S_1$) to the data routing unit 124 and by a second set of output lines (138A–138D and 139) to data buffers 126A–126D (shown generally in FIG. 2 as output buffers unit 126). Data buffer 126A is coupled at a first port to data lines MD[31:24] of the memory bus 110 and at a second port to the data lines LD[31:24] of CPU local bus 106. Data buffer 126B is similarly coupled to memory bus lines MD[23:16] and lines LD[23:16], and data buffer 126C is connected to memory bus lines MD[15:7] and to CPU local bus data lines LD[15:7]. Data buffer 126D is finally coupled to a channel "A" port of data routing unit 124 and to CPU local bus data lines LD[7:0].

The operation of memory controller 102 is next considered for the configuration of FIG. 3. Upon reset of the computer system, the ROM SIZE IN signal at line 136 of memory controller 102 is driven high and is accordingly latched into latch 122. A ROM SIZE OUT signal is thus driven high at an output line 137 of latch 122, and thereby indicates to the interface control unit 120 that ROM bank 123 is an 8-bit ROM. It is noted that line 136 could be passively pulled high to drive the ROM SIZE OUT signal high upon reset (in the absence of a ROM SIZE IN signal) to thereby indicate that a default 8-bit bank is connected within the computer system.

Following reset, if a memory read cycle is executed by the system microprocessor on CPU local bus 106, a memory read signal MEMRD and a local bus address signal LA[31:0] is received by interface control unit 120. Interface control unit 120 accordingly determines whether the memory read request corresponds to a memory location contained by one of the ROM banks 120–123. If the memory read request corresponds to a location contained by one of the 32-bit ROM banks 120–122, address translator 134 translates the local bus address signal LA[31:0] to a corresponding physical address of the ROM bank 120–122 being accessed, and drives the memory address signal MA[18:0] with the physical address. Control logic unit 130 simultaneously drives the chip enable signal CE[3:0] to enable one of the ROM banks 120–122, and asserts the output enable signal to cause the requested data to be driven from the ROM bank (120–122) on memory bus data lines MD[31:0]. If, for example, the memory read operation executed on CPU local bus corresponds to a memory location contained by ROM bank 120, the translated physical address MA[18:0] is provided to ROM bank 120. ROM bank 120 is simultaneously selected by one of the chip enable signals CE[3:0] and the requested data is driven at the output port of ROM bank 120 in response to the asserted OUTPUT ENABLE signal.

At the same time the requested data is driven on the memory bus data lines [31:0], interface control unit 120 drives the select lines $S_0$ and $S_1$ of data routing unit 124 such that data path "A" is selected. Accordingly, when the 32-bit data is driven on the memory data lines MD[31:0], the three upper bytes of the 32-bit data are provided directly to the data buffers 126A–126C, respectively. The lower byte of data on lines MD[7:0] is simultaneously channelled through data routing unit 124 and is provided to data buffer 126D. The interface control unit 120 then generates a set of control signals on lines 138A–138D and on line 139 to latch the 32-bit data into buffers 126A–126D and to enable the tri-stated output ports of buffers 126A–126D. Interface control unit 120 simultaneously asserts a ready signal RDY to indicate to the microprocessor that the requested 32-bit data is being driven on the CPU local bus 106.

If, on the other hand, the memory read request executed on CPU local bus 106 corresponds to a memory location contained by the 8-bit BIOS ROM bank 123, and if the request is for 16 or 32-bits of data (as indicated by the byte enable signal BE[3:0]), interface control unit 120 executes several successive memory read operations to access the 16 or 32-bits of data from ROM bank 123. During these memory read operations, the data routing unit 124 is controlled to channel each 8-bit byte of data from ROM bank 123 to the appropriate byte lane of CPU local bus 106 (i.e., in this embodiment, CPU local bus includes a first byte lane LD[7:0], a second byte lane LD[15:8], a third byte lane LD[23:16], and a fourth byte lane LD[31:24]).

For example, if a 32-bit memory read cycle is executed by the microprocessor on CPU local bus 106, interface control unit 120 receives the memory read signal MEMRD along with the local bus addressing signal LA[31:0]. Interface control unit 120 accordingly translates the local bus address signal LA[31:0] to a corresponding memory address signal MA[18:0], drives the chip enable signals CE[3:0] to enable ROM bank 123, and asserts the OUTPUT ENABLE signal. Since the ROM SIZE OUT signal stored by latch 122 indicates that the ROM bank 123 is an 8-bit bank, and since the byte enable signals BE[3:0] indicate that the current request is a 32-bit transfer from ROM bank 123 (i.e., signal BE[3:0] is set at "0000"), the sequencer 132 drives the select lines $S_0$ and $S_1$ such that data routing unit 124 selects data path "A". The 8-bit byte of data read from ROM bank 123 is thereby transferred to data buffer 126D. At the same time, control logic unit 130 asserts a control signal on line 138D to latch the byte of data into data buffer 126D. Control logic unit 130 then deasserts the OUTPUT ENABLE signal provided to ROM bank 123.

Sequencer 132 next causes the address value on memory address bus MA[18:0] to increment by one, and drives the select lines $S_0$ and $S_1$ such that data path "B" is selected. The control logic unit 130 again asserts the OUTPUT ENABLE signal, and the next byte of data from ROM bank 123 is provided on lines MD[7:0] and is routed through data routing unit 124 to data buffer 126C. At this point, control logic unit 130 asserts a control signal at line 138C to latch the data into data buffer 126C. As before, the control logic unit 130 then deasserts the OUTPUT ENABLE signal, and sequencer 132 increments the memory address and causes data routing unit 124 to select data path "C". The OUTPUT ENABLE signal is reasserted, and the third 8-bit byte of data is routed through data routing unit 124 and is latched into data buffer 126B. Finally, a fourth byte of data is read from ROM bank 123 by again deasserting the OUTPUT ENABLE signal, incrementing the memory address signal MA[18:0] by one, selecting data path "D" of data routing unit 124, and reasserting the OUTPUT ENABLE signal. The 8-bit data is thereby routed through data routing unit 124 and is latched into data buffer 126A.

When the four bytes of requested data (stored within the successive locations of ROM bank 123) have been latched within buffers 126A–126D, a control signal is asserted by interface control unit 120 at line 139 to enable the tri-state output ports of data buffers 126A–126D to thereby drive the 32-bit data simultaneously on lines LD[31:0] of CPU local bus 106. The ready signal RDY is concurrently asserted by interface control unit 120 to indicate to the microprocessor that the data is now available.

The operation of non-volatile memory controller 102 is similar if the memory read cycle executed by the microprocessor on CPU local bus 106 is a 16-bit transfer request as indicated by the byte enable signals BE[3:0]. In this situation, address translator 134 determines the address location of ROM bank 123 that contains the lower byte of data corresponding to the local bus addressing signal LA[31:0], and drives the memory address signal MA[18:0] accordingly. Depending upon the byte enable signal BE[3:0], the data routing unit 124 is controlled to provide successive bytes of data from ROM bank 123 to either data buffers 126A and 126B through data paths "D" and "C", respectively, or to data buffers 126C and 126D through byte paths "B" and "A", respectively. For example, if the byte enable signal BE[3:0] is set to "1100", address translator 134 determines the starting address location of the first byte of requested data and data routing 124 is controlled to first select data path "A". The OUTPUT ENABLE signal is asserted by control logic unit 130 and the first byte of the data is thereby routed through data routing unit 124 to data buffer 126D. The control signal at line 138D is simultaneously asserted to latch the data into data buffer 126D. The OUTPUT ENABLE signal received by ROM bank 123 is subsequently deasserted by interface control unit 120, and the sequencer 132 increments the memory address signal MA[18:0] by one, and causes data routing unit 124 to select data path "B". The OUTPUT ENABLE signal is then reasserted, and the next byte of data is provided from ROM bank 123 through data routing unit 124 and is latched into data buffer 126C. Once both bytes of data have been provided to data buffers 126C and 126D, a control signal on line 139 is asserted by interface control unit 120 to enable the tri-stated output ports of data buffers 126A–126D, and the 16-bit data is thereby driven on lines LD[15:0] of CPU local bus 106. The ready signal RDY is simultaneously asserted by interface control unit 120 to indicate that valid data is being driven on CPU local bus 106.

If a similar memory read cycle is executed on CPU local bus 106 while the byte enable signal [3:0] is set at "0011", the memory address lines MA[18:0] are driven with a starting value which is two locations above the starting value of the previous situation (when the byte enable signal BE[3:0] was set at "1100"). For this situation, during the first memory access operation, the first 8-bit byte of data is transferred from ROM bank 123 through the first data routing unit 124 and is latched into buffer 126B. During the next memory access, the second byte of data stored within the subsequent memory location is channeled through channel "D" of data routing unit 124 to channel "C" of buffer 126A. When the two bytes of data have been latched into buffers 126A and 126B, the control signal at line 139 is asserted by interface control unit 120 to enable the tri-stated output ports of data buffers 126A–126D, and the data is driven on lines LD[31:16] of CPU local bus 106. Interface control unit 120 simultaneously asserts the ready signal RDY to indicate to the microprocessor that valid data is being driven on CPU local bus 106.

If the byte enable signals BE[3:0] instead indicate that the current memory read cycle executed on CPU local bus 106 is a request for a single 8-bit byte of data, address translator 134 determines the address location within ROM bank 123 that contains the requested byte of data, and drives the memory address signal MA[18:0] accordingly. Depending upon the byte enable signal BE[3:0], data routing unit 124 is controlled such that the 8-bit byte data is channeled through one of the paths A–D to the corresponding byte lane of CPU local bus 106 (i.e., through one of the data buffers 126A–126D). When the byte of data is driven on the appropriate byte lane of CPU local bus 106, the ready signal RDY is asserted by interface control unit 120 to complete the cycle.

Figure 4:
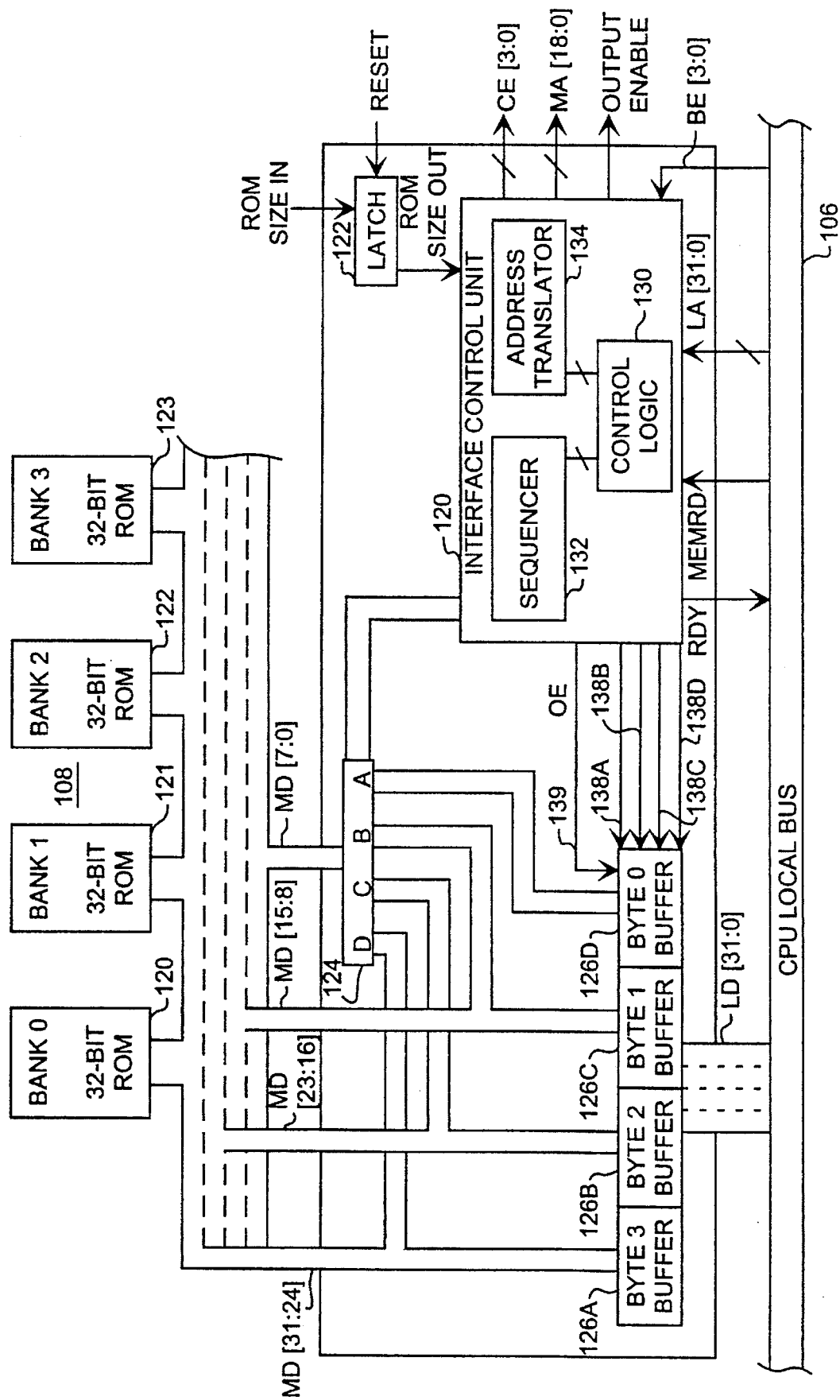
FIG. 4 is a block diagram of the memory controller connected to a ROM array including only 32-bit banks of ROM.
Figure 5A:
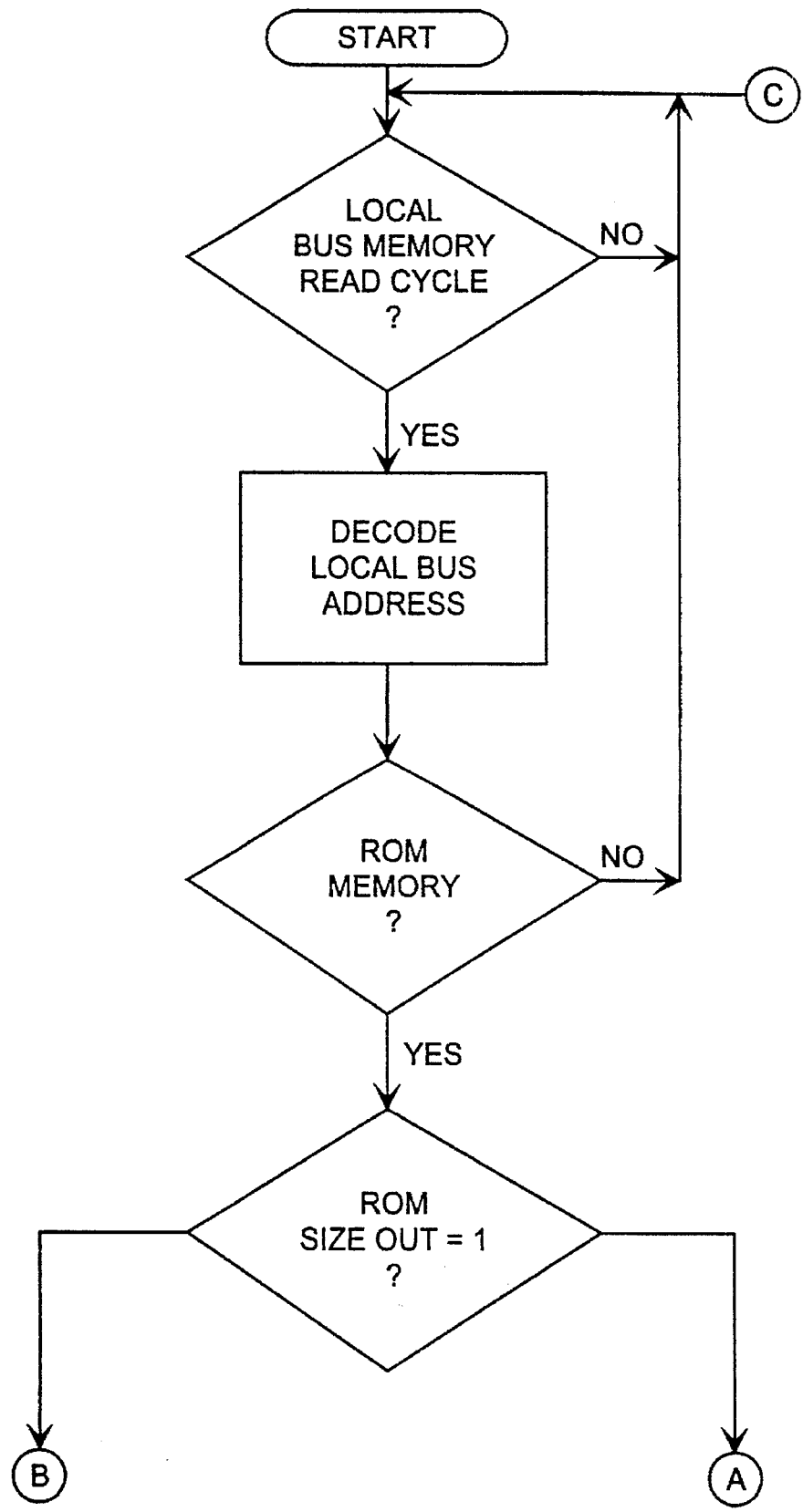
FIGS. 5a–5d are flow diagrams that depict the operation of the memory controller.
Figure 5B:
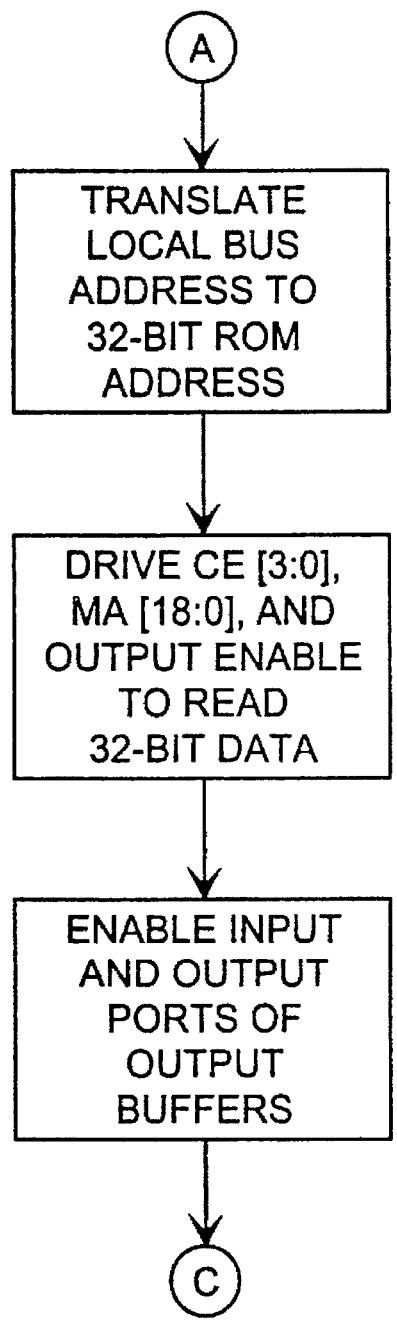
Figure 5C:
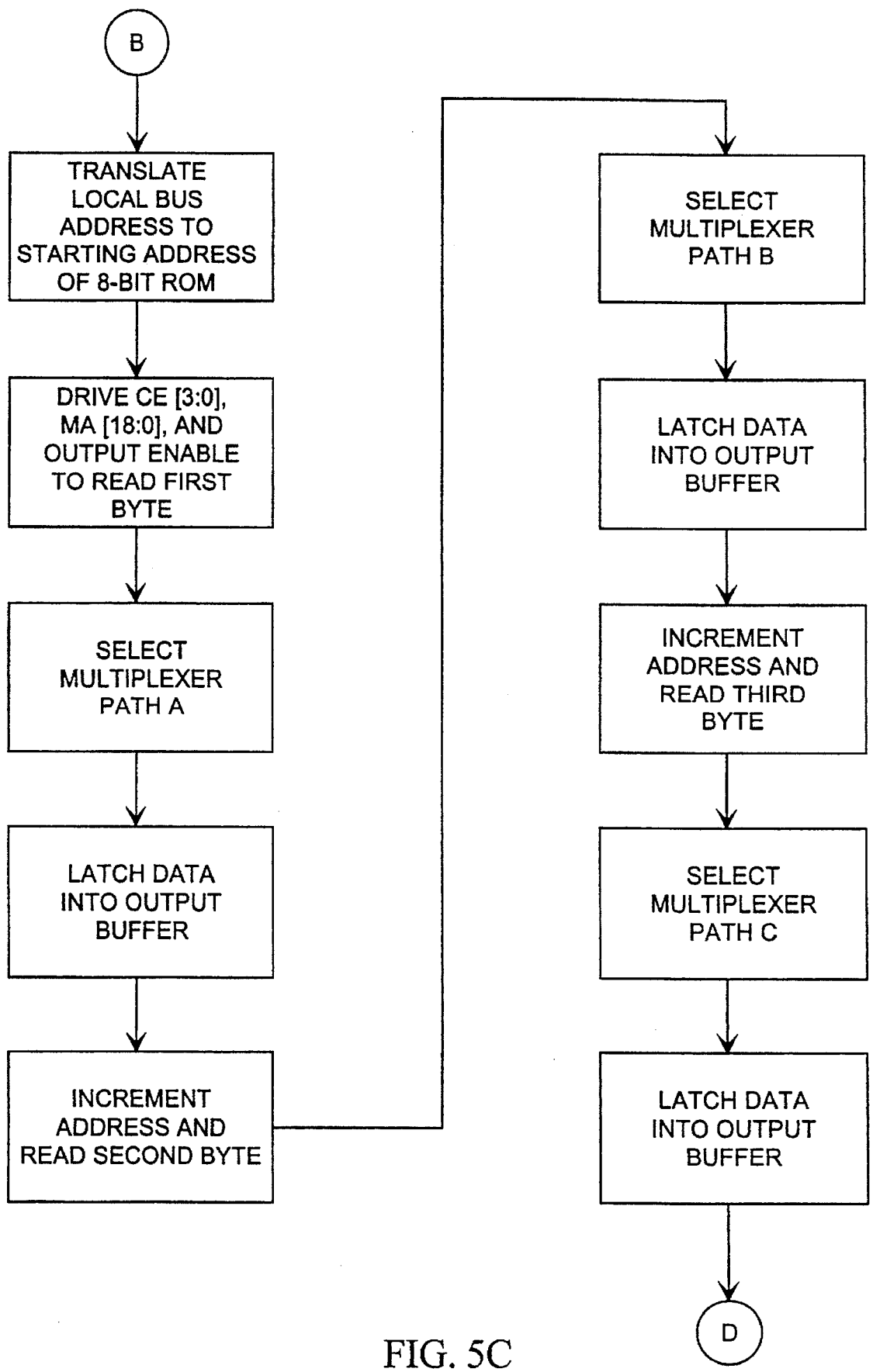
Figure 5D:
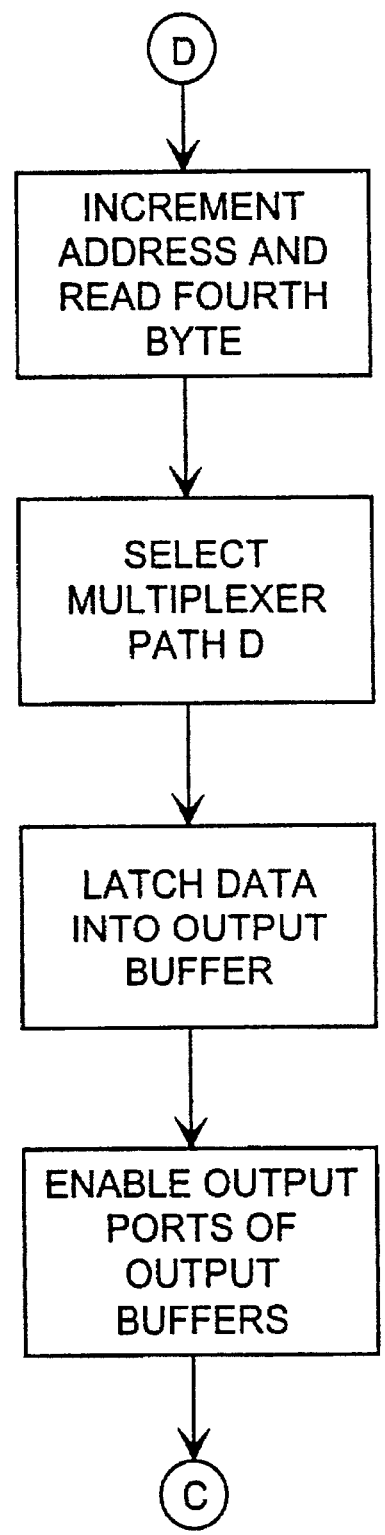

Referring next to FIG. 4, a block diagram is shown that illustrates another configuration of the computer system in which ROM bank 123 of ROM array 108 is a 32-bit ROM bank. During operation for this configuration, upon reset, the ROM SIZE IN signal provided to latch 122 is driven low and is latched into latch 122. Accordingly, the ROM SIZE OUT signal is driven low to provide an indication to the interface control unit 120 that ROM bank 123 is a 32-bit ROM bank. During operation for this configuration, the select signals $S_0$ and $S_1$ are driven such that data routing unit 124 always channels data through data path "A", and sequencer 132 is disabled. Accordingly, when a memory read cycle is executed on CPU local bus 106 that corresponds to a memory location of ROM bank 123, the address translator 134 translates the local bus address signal LA[31:0] and drives the corresponding physical address signal on lines MA[18:0]. The interface control unit 120 drives the chip enable signals CE[3:0] to enable ROM bank 123, and asserts the OUTPUT ENABLE signal to drive the 32-bit data from ROM bank 123 onto the memory data lines MD[31:0]. The 32-bit data is thereby provided to buffers 126A–126D. The interface control unit 120 then asserts the control signal at line 139 to enable the tri-stated output ports or buffers 126A–126D to thereby drive the 32-bit data on the local bus data lines LD[31:0]. The ready signal is simultaneously asserted by interface control unit 120 to indicate to the microprocessor that valid data is being driven on CPU local bus 106. This completes the memory access operation. It is noted that for this configuration, read requests from bank 123 are handled identically to those of banks 120–122.

FIGS. 5A–5D are flow diagrams that depict the operation of memory controller 102 for a 32-bit write operation. It is noted that interface control unit 120 may be implemented using a state machine that operates according to the above description. It is further noted that computer-aided design tools may be employed to reduce the interface control unit 120 to a sequential logic circuit. Exemplary computer-aided design tools include the VHSIC hardware description language and the Verilog description language.

In accordance with the system described above, a memory controller is provided that allows the bit width of memory bank 123 to be varied according to the user's requirements. In one configuration, memory bank 123 may comprise flash memory having a relatively small bit width for storing BIOS code. The advantages of flash storage can thereby be provided while minimizing cost. Larger capacity and higher performance ROM banks having a wider bit width are additionally provided for storing, for example, user application software and/or the disk operating system software.

In another configuration, the 8-bit memory bank may be replaced with a larger capacity, larger bit width memory bank. This configuration is suitable for applications in which the memory capacity must be maximized or if flash storage is not required for the BIOS code. Accordingly, the memory controller advantageously supports low cost systems as well as high memory capacity systems.

It is noted that the memory controller 102 described above may further support memory write operations. Such operations may be desirable to reprogram the BIOS code contained by the flash memory of ROM bank 123. To support such memory write operations, data routing unit 124 and buffers 126A–126D are bidirectional. Control signals similar to those described previously are provided to the ROM array 108 and data buffers 126A–126D to effectuate a desired write operation. The generation of the addressing signal MA[18:0] and the control of data routing unit 124 is identical to that described previously.

It is further noted that the non-volatile memory array controller described above may further implement the chip enable encoding method taught within the copending, commonly assigned patent application entitled "Non-Volatile Memory Chip Enable Encoding Method and Computer System Employing the Same", by MacDonald et al., filed concurrently herewith, Ser. No. 08/166,324, filed Dec. 10, 1993. This patent application is incorporated herein by reference in its entirety.

Numerous variations and modifications will become apparent to those skilled in the art once the above disclosure is fully appreciated. For example, microprocessor 104 and non-volatile memory controller 102 could be fabricated on a common integrated processor chip. Furthermore, it is understood that the particular bit widths and capacities of banks 120–123 could be different from those described above, and that other non-volatile memory devices such as flash memory devices could be used to implement banks 120–123. It is intended that the following claims be interpreted to embrace all such variations and modifications.

What is claimed is:

1. A computer system comprising:

a microprocessor;

a local bus coupled to said microprocessor and including at least a first byte lane and a second byte lane;

a memory controller coupled to said local bus;

a memory data bus coupled to said memory controller and including at least a first byte lane and a second byte lane; and a first bank of non-volatile memory coupled to said memory data bus;

wherein said memory controller includes:

a first output buffer configured to drive data from said first bank of non-volatile memory on said first byte lane of said local bus and a second output buffer configured to drive data from said first bank of non-volatile memory on said second byte lane of said local bus;

a data routing unit configured to selectively route data from said first byte lane of said memory data bus to either said first output buffer or to said second output buffer; and an interface control unit configured to receive at least one local bus control signal, wherein said interface control unit is configured to generate at least one memory control signal in response to said at least one local bus control signal such that data is provided from said first bank of non-volatile memory simultaneously to said first and said second byte lanes of said memory data bus if a memory size input signal indicates that said first bank of non-volatile memory has a first predetermined bit width, and wherein said interface control unit is configured to generate at least one memory control signal in response to said at least one local bus control signal such that data is sequentially provided from said first bank of non-volatile memory through said first byte lane of said memory data bus to said data routing unit if said memory size input signal indicates that said first bank of non-volatile memory has a second predetermined bit width.

2. The computer system as recited in claim 1 wherein said memory controller further includes a sequencer coupled to said data routing unit configured to provide a select signal to said data routing unit.

3. The computer system as recited in claim 1 wherein said memory controller further comprises a latch coupled to said interface control unit configured to store said memory size input signal.

4. The computer system as recited in claim 3 wherein said memory size input signal is latched into said latch upon system reset.

5. The computer system as recited in claim 1 further comprising a second bank of non-volatile memory coupled to said memory data bus, wherein said interface control unit is configured to generate said at least one memory control signal in response to said at least one local bus control signal such that data is provided from said second bank of non-volatile memory simultaneously to said first and second byte lanes of said memory data bus.

6. The computer system as recited in claim 1 wherein one of said at least one memory control signals is a memory address signal and one of said at least one local bus control signals is a local bus address signal and wherein said memory controller further includes an address translator coupled to said interface control unit configured to translate said local bus address signal into said memory address signal.

7. The computer system as recited in claim 1 wherein said first byte lane of said memory data bus is an 8-bit byte lane, wherein said second byte lane of said memory bus is an 8-bit byte lane, and wherein said first bank has a bit width of 8-bits.

8. The computer system as recited in claim 7 wherein said local bus includes a third byte lane and a fourth byte lane, wherein said third and fourth byte lanes are each 8 bits wide.

9. The computer system as recited in claim 8 wherein said memory controller further includes:

a third output buffer configured to drive data from said first bank of non-volatile memory on said third byte lane of said local bus; and a fourth output buffer configured to drive data from said first bank of non-volatile memory on said fourth byte lane of said local bus.

10. The computer system as recited in claim 9 wherein said data routing unit is configured to selectively route data from said first byte lane of said memory data bus to either said first output buffer, to said second output buffer, to said third output buffer, or to said fourth output buffer depending upon a select signal.

11. The computer system as recited in claim 8 further comprising a second bank of non-volatile memory coupled to said memory data bus, wherein said second bank of non-volatile memory is a 32-bit bank of memory.

12. A memory controller comprising:

a first output buffer configured to drive data from a first bank of non-volatile memory on a first byte lane of a local bus;

a second output buffer configured to drive data from said first bank of non-volatile memory on a second byte lane of said local bus;

a data routing unit configured to selectively route data from a first byte lane of a memory data bus to either said first output buffer or to said second output buffer; and an interface control unit configured to receive a local bus read signal and a local bus address signal, wherein said interface control unit is configured to generate a memory read signal and a memory address signal in response to said local bus read signal and said local bus address signal such that data is provided from said first bank of non-volatile memory simultaneously to said first byte lane and to a second byte lane of said memory data bus if a memory size input signal indicates that said first bank of non-volatile memory has a first predetermined bit width, and wherein said interface control unit is configured to generate a first and a second memory read signal in response to said local bus read signal such that data is sequentially provided from said first bank of non-volatile memory through said first byte lane of said memory data bus to said data routing unit if said memory size input signal indicates that said first bank of non-volatile memory has a second predetermined bit width.

13. The computer system as recited in claim 12 wherein said memory controller further includes a sequencer coupled to said data routing unit configured to provide a select signal to said data routing unit.

14. The computer system as recited in claim 12 wherein said memory controller further comprises a latch coupled to said interface control unit configured to store said memory size input signal.

15. The computer system as recited in claim 14 wherein said memory size input signal is latched into said latch upon system reset.

16. The computer system as recited in claim 15 wherein said memory controller further includes an address translator coupled to said interface control unit configured to translate said local bus address signal into said memory address signal.

17. The computer system as recited in claim 16 wherein said first byte lane of said memory data bus is an 8-bit byte lane, wherein said second byte lane of said memory data bus is an 8-bit byte lane, and wherein said first bank has a bit width of 8-bits.

18. A method for operating a memory controller, wherein said memory controller is connected to a first memory bank, to a second memory bank, to a first byte lane of a local bus, and to a second byte lane of said local bus, said method comprising the steps of:

providing a control signal to said memory controller indicative of the bit width of said second memory bank;

executing a memory read cycle on said local bus;

determining whether said memory read cycle corresponds to a memory location contained by said first memory bank or by said second memory bank;

reading a first byte and a second byte of data from said first memory bank simultaneously and providing said first and second bytes of data to said first and second byte lanes of said local bus if said memory read cycle corresponds to a location within said first memory bank; and if said memory read cycle corresponds to a memory location contained by said second memory bank:

reading a first and a second byte of data from said second memory bank simultaneously and providing said first and second bytes of data to said first and second byte lanes of said local bus if said control signal indicates that said second memory bank has a first predetermined bit width; or reading a first byte of data from said second memory bank;

providing said first byte of data to a data routing unit;

selectively routing said first byte of data from said data routing unit to a first buffer;

reading a second byte of data from said second memory bank subsequent to the reading of said first byte of data;

providing said second byte of data to said data routing unit;

selectively routing said second byte of data from said data routing unit to a second buffer; and providing said first and second bytes of data from said first buffer and second buffer to said local bus simultaneously.

19. The method as recited in claim 18 comprising the further step of providing a byte enable signal to said memory controller.

20. The method as recited in claim 18 comprising the further step of latching said control signal into said memory controller.

* * * * *